US012452190B2

(12) United States Patent
Bishop et al.

(10) Patent No.: US 12,452,190 B2
(45) Date of Patent: Oct. 21, 2025

(54) ALGORITHM AND DIFFERENTIATED WEIGHTS FOR RESOURCE CONSTRAINED PROCESSES

(71) Applicant: MICROSOFT TECHNOLOGY LICENSING, LLC, Redmond, WA (US)

(72) Inventors: Adam Thomas Bishop, Morrisville, NC (US); Vlade Lekic, Belgrade (RS); Yogesh Kumar, Sammamish, WA (US); Muthukumaran Arumugam, Kent, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 13 days.

(21) Appl. No.: 18/538,657

(22) Filed: Dec. 13, 2023

(65) Prior Publication Data
US 2025/0202836 A1 Jun. 19, 2025

(51) Int. Cl.
*H04L 47/80* (2022.01)
*H04L 47/74* (2022.01)
*H04L 47/83* (2022.01)

(52) U.S. Cl.
CPC .......... *H04L 47/808* (2013.01); *H04L 47/745* (2013.01); *H04L 47/83* (2022.05)

(58) Field of Classification Search
CPC ...... H04L 47/808; H04L 47/83; H04L 47/745
See application file for complete search history.

(56) References Cited

U.S. PATENT DOCUMENTS

| 11,044,162 | B2* | 6/2021 | Byers | H04L 43/08 |
| 12,056,255 | B1* | 8/2024 | Mystetskyi | H04L 9/3213 |
| 2009/0178142 | A1* | 7/2009 | Lieblich | G06F 21/316 726/25 |
| 2013/0275581 | A1* | 10/2013 | Yu | H04L 67/535 709/224 |
| 2014/0278738 | A1* | 9/2014 | Feit | G06Q 30/0201 705/7.29 |
| 2015/0188782 | A1* | 7/2015 | Carlin | H04L 67/10 709/226 |
| 2018/0191581 | A1* | 7/2018 | Yu | H04L 41/042 |

(Continued)

*Primary Examiner* — Chris Parry
*Assistant Examiner* — Hassan Abdur-Rahman Khan
(74) *Attorney, Agent, or Firm* — Newport IP, LLC; Jacob P. Rohwer

(57) ABSTRACT

The techniques disclosed herein enhance the functionality of network computing infrastructure in resource constrained processes. This is accomplished by assigning differentiated weights to instances of a software service based on the role of the instance. In the context of the present disclosure, a role is a defined set of functionalities within a software service. An individual weight quantitatively represents the computing resource demand imposed by the functionalities of the role. A software orchestration system subsequently places the instances of the software service within a computing environment (e.g., a node, a cluster) for execution. As such, the computing environment can include a resource constraint that represents the capacity of the constituent computing resources to execute the instances of the software service. Accordingly, the instances are placed such that the sum of the weights of the instances is less than or equal to the resource constraint.

20 Claims, 8 Drawing Sheets

(56) References Cited

U.S. PATENT DOCUMENTS

| | | | |
|---|---|---|---|
| 2020/0409691 A1* | 12/2020 | Mukhopadhyay | ............................ H04L 67/1097 |
| 2021/0075853 A1* | 3/2021 | Banerjee | ............. H04L 67/1008 |
| 2021/0390029 A1* | 12/2021 | Zhao | .................... H04L 41/5054 |
| 2024/0281280 A1* | 8/2024 | Bainbridge | ............ G06F 9/5077 |
| 2024/0370310 A1* | 11/2024 | Knierim | ................ G06F 9/5027 |
| 2024/0394379 A1* | 11/2024 | Gorelik | ................. G06F 21/577 |

\* cited by examiner

ALGORITHM AND DIFFERENTIATED WEIGHTS FOR RESOURCE CONSTRAINED PROCESSES

BACKGROUND

More and more modern software applications utilize the performance and flexibility of network computing infrastructure such as cloud computing services. As such, computing service providers are tasked with managing and organizing computing resources to execute thousands and even millions of individual software processes. Oftentimes, a cloud service provider can utilize an orchestration system to automate the configuration and coordination of computing hardware and software. In various examples, the computing resources can include virtual machines as well as physical ("bare metal") machines. For instance, a plurality of nodes that make up a larger computing cluster can be collectively considered computing resources.

To provide a high-quality service, cloud computing providers can configure an orchestration system and the computing resources under its purview with mechanisms for gauging the available capacity of a given of computing environment (e.g., a node, a cluster). As such, the orchestration system can assign software processes to the computing resources within the bounds of the available capacity. In this way, the orchestration system can prevent overconsumption of computing resources thereby enhancing the user experience by reducing the likelihood of performance slowdowns and service outages.

However, many existing approaches for gauging the available capacity of a computing environment may lack the ability to account for the unique computing resource demands associated with various types of software processes. For instance, a given software service may utilize various types of software processes that have differentiated functionalities and thus impose different computing resource demands. Failing to account for these differences may lead to performance slowdowns and other inefficiencies. It is with respect to these and other considerations that the disclosure made herein is presented.

SUMMARY

The techniques described herein enable computing service providers to utilize weights to differentiate the computing resource demands of various types of software processes. Specifically, the weights can be associated with various roles that make up a software service (e.g., a stateful service). In a specific example, a given software service can include a primary role, a secondary role, and an auxiliary role. Accordingly, each role can define certain responsibilities and functionalities. For instance, the primary role can be responsible for performing read and write operations, the secondary role can receive and apply state updates from the primary role, while the auxiliary role provides read-only functionality to support the primary role. As such, a deployment of a software service can be a set of constituent instances that fulfill each of the roles (e.g., a primary instance, a secondary instance, an auxiliary instance) where an instance is a copy of the software service logic. Moreover, an instance can also be referred to as a replica (e.g., a primary replica, a secondary replica).

In the context of the present disclosure, the weights can be used to quantify the computing resource demands of a given role within a resource constrained process. In a specific example, the resource constrained process is building the set of constituent instances to prepare a software service for use. As described herein, an instance that is "in build" is one in which the state of the instance is currently in the process of being defined. This can be achieved by retrieving data from an external store, constructing the state using another instance, or any other means. As such, a given computing environment (e.g., a node, a cluster) can define a constraint that limits the number of instances that can be "in build" at a given time. Such a constraint is necessary due to the finite resource capacity of any computing environment (e.g., input/output operations per second, computing cycles per second). Accordingly, an orchestration system can assign instances to the computing environment with consideration for the limit imposed by the constraint.

However, many existing approaches for defining such constraints lack the ability to account for the different computing resource demands of different roles. For instance, the constraint may simply be a maximum number of instances (e.g., ten instances, one hundred instances). Within such a system, all instances of a software service are given the same weight in terms of computing resource consumption. That is, ten primary instances represent an equivalent resource consumption to ten secondary instances. However, this assumption may not be true in practice due to the differing responsibilities and functionalities between the primary role and the secondary role. Consequently, such a constraint can lead to performance throttling due to resource overconsumption and thus a degraded user experience.

In contrast, the techniques described herein assigned differentiated weights to each role of a software service representing an aggregate computing resource demand for a given role based on the various resource needs of the role. In various examples, the weight can be a whole or fractional numerical value (e.g., 5, 1.5). In a simple example, a software orchestration system can receive a primary instance and a secondary instance of a software service for placement at a computing environment (e.g., for building). Accordingly, the primary instance and the secondary instance can respectively include a primary role and a secondary role defining the functionality of the associated instances.

In addition, the software orchestration system can receive a first weight and a second weight that represent the computing resource demand of the first instance and the second instance respectively. In various examples, the weights can be globally defined by the software service such that all instances of a given role of the software service have the same weight. For instance, all primary instances fulfill the primary role and thus are assigned the same weight. Conversely, primary instances of different software services may be assigned different weights due to the particular resource demands of primary roles between the different software services. For the sake of discussion consider a first weight that is defined as "5" and a second weight that is defined as "3" indicating that the primary instance imposes a greater computing resource demand in relation to the secondary instance.

To place the instances within the computing environment, the software orchestration system can determine one or more resource constraints representing the capacity of the computing environment. In a specific example, the computing environment is a computing cluster comprising a plurality of nodes (e.g., virtual machines). Accordingly, each individual node can include a resource constraint representing the computing resource capacity of the associated node. Like the weights mentioned above, the resource constraint can be an aggregate representation of the computing resources of the node such as central processing units (CPUs), graphical processing units (GPUs), memory, storage, and so forth. Likewise, the resource constraint can be a whole or fractional numerical value (e.g., 10, 12.5). For the sake of discussion, consider a computing environment comprising one node with a resource constraint that is defined as "8".

Once equipped with the weights and resource constraints, the software orchestration system can proceed to assign the primary instance and the secondary instance to the computing environment such that the sum of the weights is less than or equal to the resource constraint. In the present example, the primary instance is tagged with a weight of "5" while the secondary instance is tagged with a weight of "3". As such, the primary instance and the secondary instance can be assigned to the node with the resource constraint of "8". In an alternative example, the resource constraint is "7". Consequently, the software orchestration system can assign the primary instance to the node while refraining from assigning the secondary instance to respect the resource constraint. At a subsequent point in time, when the resources of the node are freed up, (e.g., the primary instance is finished building) the software orchestration system can assign the secondary instance to the node.

The techniques discussed herein address several technical challenges associated with operating network computing infrastructure and associated services such as cloud computing. As mentioned above, existing mechanisms for managing consumption in resource constrained processes can fail to account for differences in computing resource demand between various types of software processes (e.g., roles). Consequently, such systems can lead to performance throttling, build failures, and other hinderances leading to a degraded user experience.

In contrast, by tagging various roles with a specific weight, the disclosed techniques enable software orchestration systems to differentiate instances of a software service by the computing resource demands associated with each role. Likewise, resource constraints in a computing environment are defined based on the resource capacity of the computing environment rather than a strict count of active instances. In this way, a computing environment with a given resource constraint can guarantee a consistent level of performance for instances of a software service that assigned within the bounds of the resource constraint. As such, the discussed techniques improve the efficiency of network computing infrastructure by minimizing the likelihood of performance throttling, as well as the need to move instances from one node to another during execution.

In another example of the technical benefit of the present disclosure, the weights can be dynamically adjusted in response to suit changing conditions within the computing environment. For example, a role can be assigned a weight of "0" to allow for unlimited builds of the role. Such a weight can be useful for representing roles that involve little to no computing resource demand. A weight of "0" can also be utilized during times of high resource availability to enable the software orchestration system to initialize a large number of instances and maximize utilization. Conversely, weights can be increased during times of low resource availability to prevent the software orchestration system from placing instances within computing environments where resources are few. In this way, the differentiated weights provide greater flexibility to a computing service provider.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein enhance the functionality of network computing infrastructure in resource constrained processes. A specific example of a resource constrained process is building instances of a software service in which the instances are initialized in preparation for handling external requests. In various examples, building an instance can involve creating a state of the instance by retrieving data from an external store, constructing the state using another instance, or any other means. This is accomplished by assigning differentiated weights to instances of a software service based on the role of the instance. For example, a software service can include a primary role, a secondary role, and an auxiliary role where each role respectively defines a set of responsibilities and functionalities. As such, instances of differing roles can impose accordingly different computing resource demands. By assigning weights to these roles, the present techniques enable software orchestration systems to differentiate between the varying computing resource demands between roles. That is, an individual weight represents an aggregated computing resource demand imposed by the associated role.

In addition, the present techniques include a resource constraint that is assigned to a computing environment that is executing the instances of the software service using a constituent set of computing resources. As mentioned above, computing resources can include virtual machines as well as physical ("bare metal") machines. For instance, a plurality of nodes that make up a larger computing cluster can be collectively considered a computing environment comprising a set of computing resources. In an opposite way to the weights mentioned above, an individual resource constraint represents an aggregated computing resource capacity of a computing environment (e.g., a node, a cluster). For example, a cluster comprising a plurality of nodes can include a corresponding plurality of resource constraints where each individual resource constraint represents the particular computing resource capacity of each individual node.

Accordingly, a software orchestration system can be configured to assign pending instances of a software service to a computing environment. In a specific example, the instances are assigned to the computing environment for building prior to servicing external requests as mentioned above. Utilizing the differentiated weights and the resource constraints, the software orchestration system can assign the instances such that the sum of weights of the pending instances is less than or equal to the resource constraint of the computing environment.

Various examples, scenarios, and aspects that enable utilizing differentiated weights and resource constraints to assign instances of a software service to a computing environment are described below with respect to FIGS. 1-7.

Figure 1:
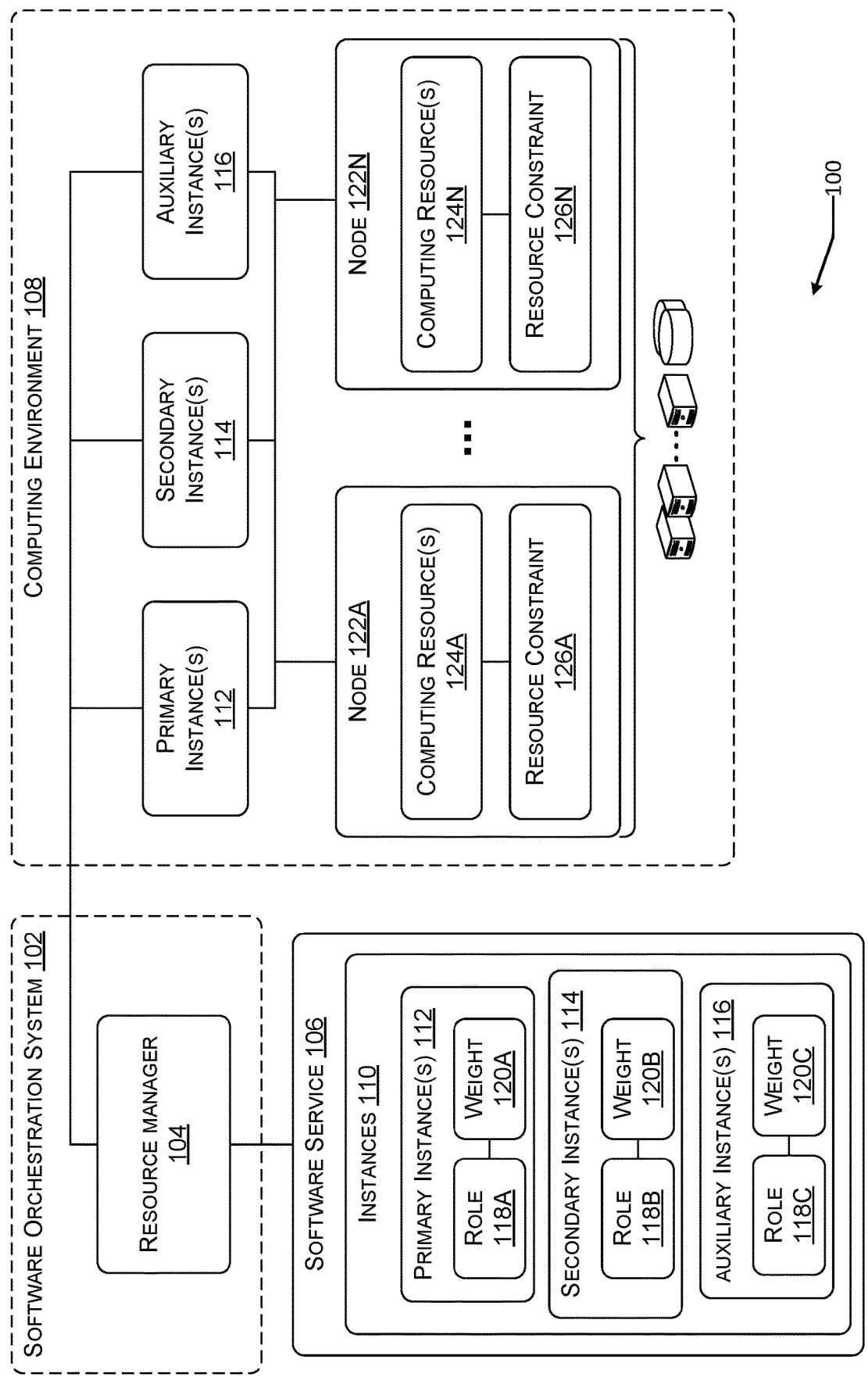
FIG. 1 is a block diagram of a system for assigning instances of a software service to a computing environment utilizing differentiated weights and resource constraints.

FIG. 1 illustrates a system 100 in which a software orchestration system 102 utilizes a resource manager 104 to assign a software service 106 to a computing environment 108. Generally described, a software orchestration system 102 is a software tool which automates the configuration and coordination of computing hardware and software, oftentimes in the context of cloud computing. Examples of software orchestration systems include KUBERNETES, CLOUDFORMATION by AMAZON, and SERVICE FABRIC by MICROSOFT.

In various examples, the software service 106 can be partitioned into various sets of instances 110 where a single set of instances 110 is responsible for a portion of the complete state of the software service 106. In this way, the software service 106 can grow in scale by initializing additional sets of instances 110 (e.g., partitions) which are distributed and balanced across the computing environment 108. Accordingly, each set of instances 110 can include different types of instances such as a primary instance 112, a secondary instance 114, and an auxiliary instance 116. Each type of instance 112-116 can be assigned a corresponding role 118A-118C which defines the responsibilities and functionalities of the associated instance 112-116. For example, the role 118A defines the functionality of the primary instance 112. Likewise, the role 118B defines the functionality of the secondary instance 114 and the role 118C defines the functionality of the auxiliary instance 116.

As such, the differing functionalities defined by the roles 118A-118C can result in correspondingly different computing resource demands. In a specific example, the role 118A defines the primary instance 112 as responsible for performing read and write operations for a given partition of the software service 106. Conversely, the role 118B defines the secondary instance 114 as responsible for receiving and applying state updates from the primary instance 112. In this way, building and/or executing the primary instance 112 can impose a different computing resource demand from building and/or executing the secondary instance 114.

To represent and quantify these differing computing resource demands, each of the roles 118A-118C can be tagged with a corresponding weight 120A-120C. In various example, the weights 120A-120C can be whole or fractional numerical values (e.g., "5", "1.5"). Moreover, a greater weight 120A-120C can indicate a proportionally greater computing resource demand. For instance, a weight 120A of "5" can be understood to impose twice the computing resource demand as a weight 120B of "2.5".

In various examples, the weights 120A-120C can be calculated from a stress test of each associated role 118A-118C. For example, a primary instance 112 can be executed in a test environment to observe and measure the computing resource demand. Accordingly, the weight 120A can be calculated by comparing the measured computing resource demand against a predefined baseline computing resource demand. In an alternative example, the weights 120A-120C can be calculated based on a theoretical resource demand of the associated roles 118A-118C derived from the defined functionalities, data requirements, dependencies, and other factors.

To initialize a new partition, the software service 106 can submit a set of instances 110 to the software orchestration system 102 for placement within the computing environment 108. In response to receiving the instances 110, the resource manager 104 of the software orchestration system 102 detects the roles 118A-118C and/or the weights 120A-120C of the received instances 110. In various examples, the resource manager 104 can detect the instances 110 as part of a periodic update process in which the resource manager 104 automatically refreshes its state. Alternatively, the resource manager can be manually refreshed. It should be understood that the set of instances 110 can include any number of primary instances 112, secondary instances 114, and/or auxiliary instances 116.

Accordingly, the resource manager 104 can determine that the instances 110 originate from the software service 106 which defines the weights 120A-120C. Moreover, the resource manager 104 can detect the number of nodes 122A-122N within the computing environment 108. Generally described, a node 122A is an individual computer and may be a virtual machine or a physical machine. As such, an organized plurality of nodes 122A-122N can collectively form a cluster. Each node 122A-122N can include its own set of computing resources 124A-124N and a corresponding resource constraint 126A-126N representing an aggregate computing capacity of the associated nodes 122A-122N.

In various examples, an individual resource constraint 126A can be derived from the hardware and/or software configuration of the computing resources 124A (e.g., input/output operations per second, computing cycles per second). For example, a node 122A with a greater amount of computing resources 124A can include a relatively greater resource constraint 126A in comparison to a node 122N with relatively fewer computing resources 124N. Like the weights 120A-120C, the resource constraints 126A-126N can be a whole or fractional numerical value (e.g., 10, 12.5). It should be further understood that the computing environment 108 can contain any number of one or more nodes 122.

As will be elaborated upon below, the instances 110 can be assigned to the nodes 122A-122N such that the sum of the weights 120 of the instances 110 that are assigned to a given node 122A is less than or equal to the resource constraint 126A. In a specific example, the weights 120A is "5", the weight 120B is "2.5", the weight 120C is "1", and the resource constraint 126A is 11. Accordingly, the node 122A, having the resource constraint 126A, is capable of supporting two primary instances 112, four secondary instances 114, eleven auxiliary instances 116, or any combination of instances 110.

In various examples, the weights 120A-120C can represent the computing resource demand of an associated role 118A-118C within a specific context and/or during a particular phase of operation. As mentioned above, the weights 120A-120C are especially applicable in resource constrained processes such as building instances 110 of a software service 106 in which the instances 110 are initialized in preparation for handling external requests. In this way, a resource constraint 126A can be considered a "build limit" that restricts the number of instances 110 that the associated node 122A can be building at a given time. In another example, the resource constraint 126A can be considered a "build queue" in which the instances 110 occupy a certain amount of space within the queue as they build where the amount of space is defined by the associated weights 120A-120C. For example, returning to the example mentioned above, a primary instance 112 with a weight 120A of "5" can be considered as occupying five slots in the build queue when it is building. When the primary instance 112 is finished building, the five slots in the build queue are freed up to enable the resource manager 104 to assign more instances.

Figure 2A:
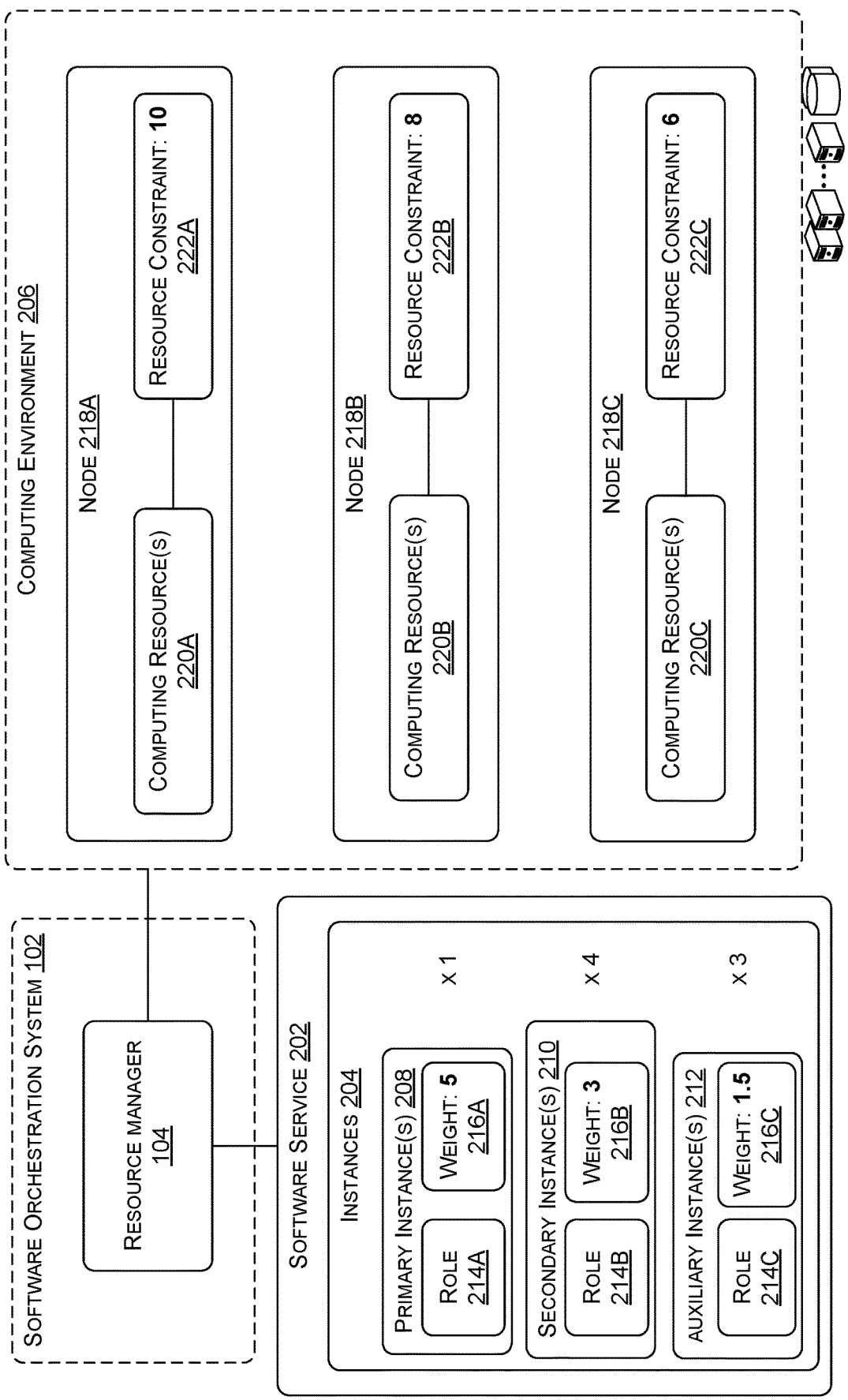
FIG. 2A illustrates a first phase of a resource manager assigning instances of a software service to a computing environment while respecting the individual resource constraints of various nodes.

Turning now to FIG. 2A, an illustrative example of a software orchestration system 102 assigning a software service 202 comprising a set of instances 204 to a computing environment 206 are shown and described. As mentioned above, a software service 202 can grow in scale by initializing a new set of instances 204 (e.g., a partition). In the present example, the set of instances 204 comprises a primary instance 208, four secondary instances 210, and three auxiliary instances 212. Like the examples previously discussed, each type of instance 208-212 includes a role 214A-214C and corresponding weight 216A-216C representing the computing resource demand of each type of instance 208-212. As shown, the primary instance 208 is assigned a weight 216A of "5" while the secondary instances 210 are assigned a weight 216B of "3" and the auxiliary instances 212 are assigned a weight 216C of "1.5". As such, the weights 216A indicate that the primary instance 208 imposes a greater computing resource demand in relation to a secondary instance 210 which in turn imposes a greater computing resource demand in relation to an auxiliary instance 212.

In response to receiving the instances 204, the software orchestration system 102 analyzes the computing environment 206 via the resource manager 104 to determine how best to place the instances 204 of the software service 202. In the present example, the computing environment 206 contains three nodes 218A-218C. Accordingly, each of the nodes 218A-218C includes a set of computing resources 220A-220C and resource constraints 222A-222C representing an aggregate computing capacity of the nodes 218A-218C. In various examples, the resource constraints 222A-222C are derived from the hardware (e.g., CPUs, GPUs) and/or software configuration of the computing resources 220A-220C.

As shown, the first node 218A includes a resource constraint 222A of "10" while the second node 218B includes a resource constraint 222B of "8" and the third node 218C includes a resource constraint 222C of "6". Consequently, the resource constraints 222A-222C indicate that the nodes 218A-218C possess differing capacities of available computing resources 220A-220C. As described above, the software orchestration system 102 is configured to assign the instances 204 to the nodes 218A-218C such that the sum of weights 216 of instances 204 at a given node 218A is less than or equal to the resource constraint 222A.

Figure 2B:
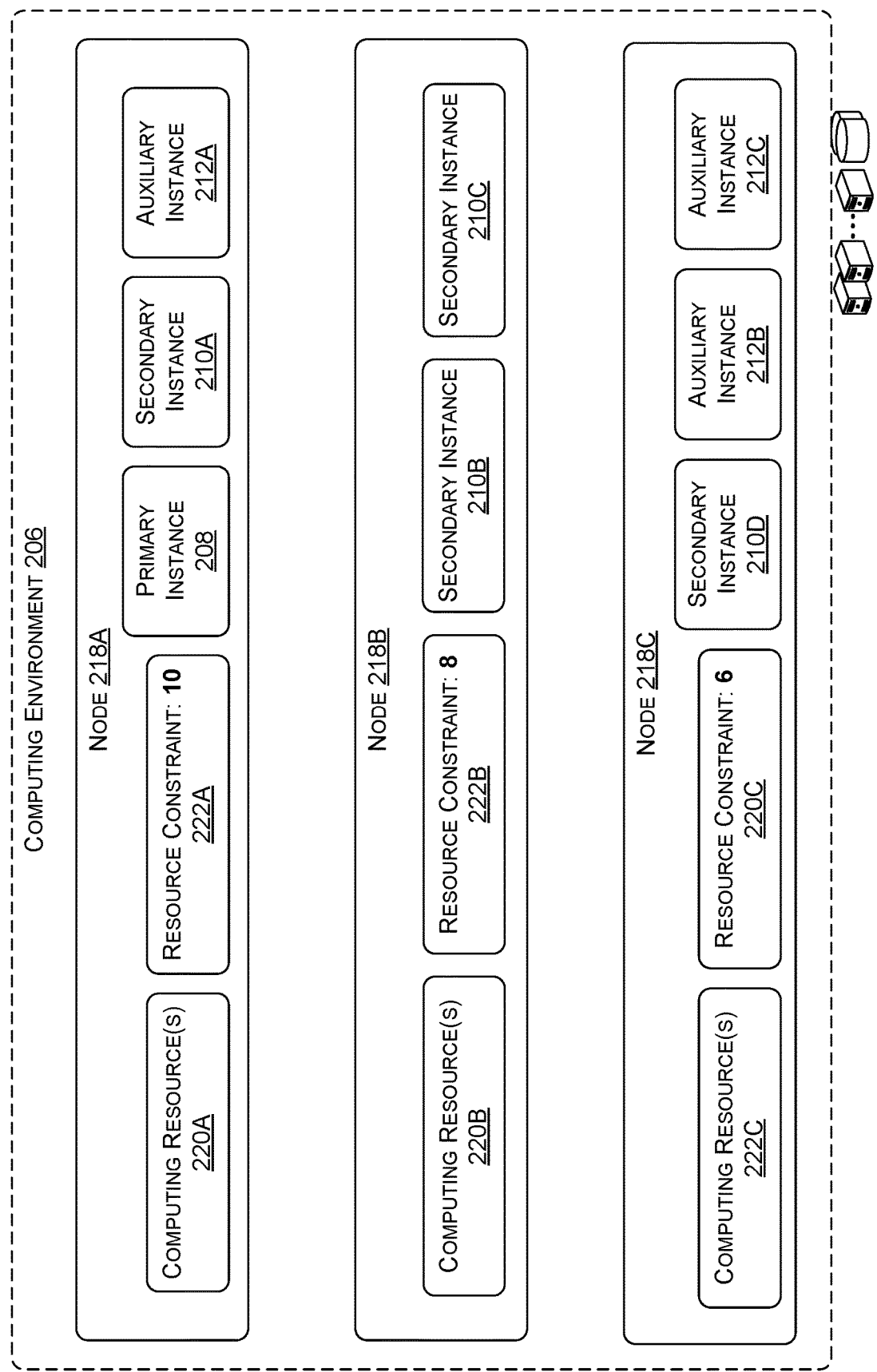
FIG. 2B illustrates a second phase of a resource manager assigning instances of a software service to a computing environment while respecting the individual resource constraints of various nodes in which all instances have been placed within the computing environment.

Proceeding to FIG. 2B, an example of a valid placement of the instances 204 is shown and described. As mentioned above, the instances 204 comprise one primary instance 208, four secondary instances 210, and three auxiliary instances 212. Accordingly, each type of instance 204 is tagged with a weight 216A ("5"), 216B ("3"), and 216C ("1.5") based on the associated role 214A-214C. Similarly, each node 218A-218C of the computing environment 206 includes a resource constraint 222A ("10"), 222B ("8"), and 222C ("6") representing a capacity of associated computing resources 220A-220C to execute the instances 204 of the software service 202.

In a specific example, the node 218A includes a resource constraint 222A of "10". As such, the software orchestration system 102 determines that the node 218A can support a primary instance 208, a secondary instance 210A, and an auxiliary instance 212A by evaluating the sum of the weights 216A-216C (i.e., 5+3+1.5=9.5≤10). Likewise, the software orchestration system 102 determines that two secondary instances 210B and 210C can be placed at the node 218B as the sum of two weights 216B for the two secondary instances 210B and 210C is less than or equal to the resource constraint 222B ("8") for the node 218B (i.e., 3+3=6≤8). In still another example, the software orchestration system 102 determines that one secondary instance 210D and two auxiliary instances 212B and 212C can be placed at the node 218C with respect to the resource constraint 220C (i.e., 3+1.5+1.5=6≤6). In this way, the software orchestration system 102 can ensure that the assigned instances 204 do not overwhelm the available computing resources 222A-222C thereby preventing performance degradation and potential outages.

Figure 3:
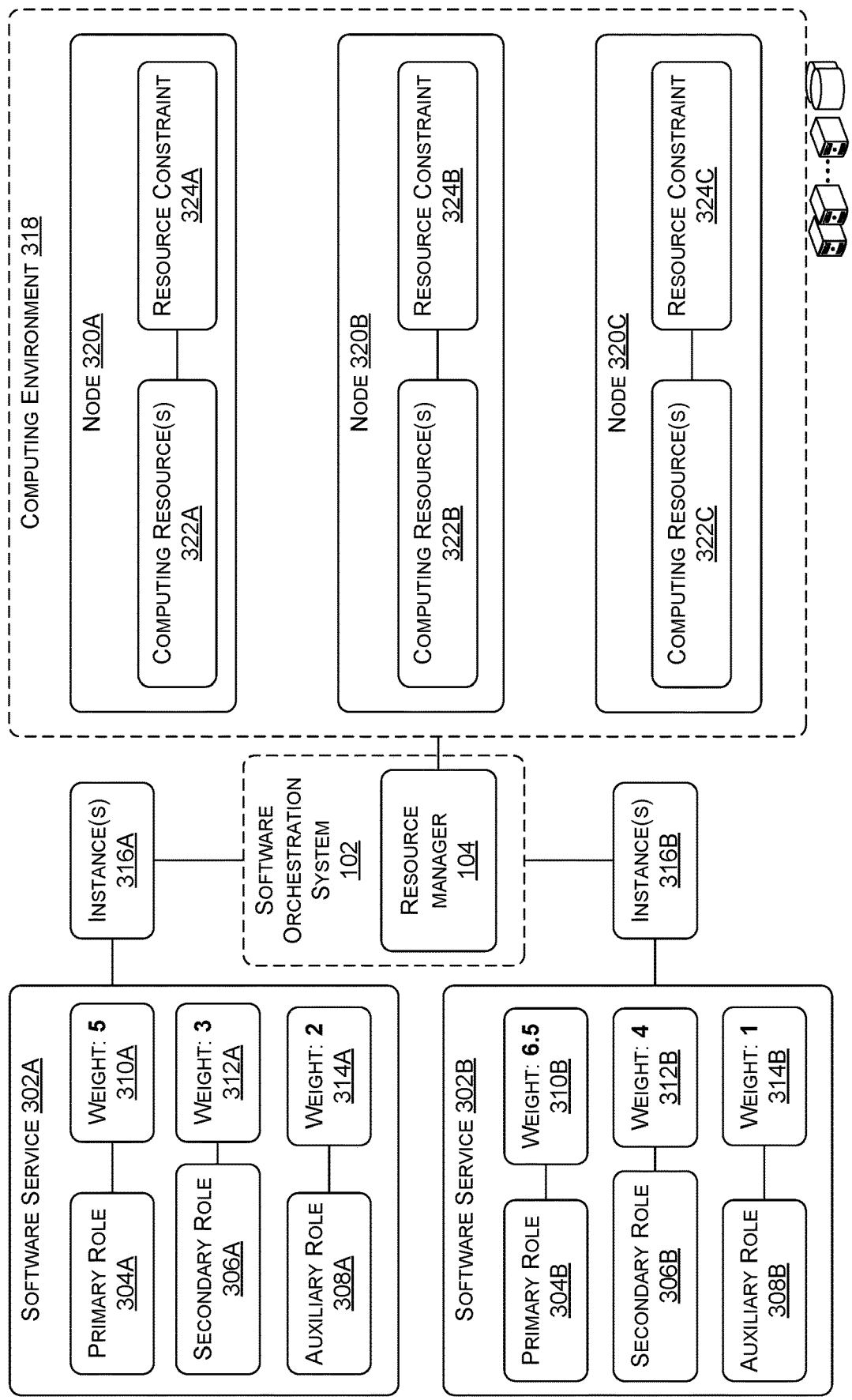
FIG. 3 illustrates a resource manager processing instances of multiple software services defining different weights to a computing environment while respecting the individual resource constraints of various nodes.

Turning now to FIG. 3, an illustrative example of a software orchestration system 102 processes instances of a first software service 302A and a second software service 302B are shown and described. As mentioned above, an individual software service 302A can include its own set of roles 304A-308A and accordingly define its own set of weights 310A-314A. That is, while the primary role 304A of the first software service 302A and the primary role 304B or the second software service 302B may serve similar purposes (e.g., performing read and write operations), the particularities of the different software services 302A and 302B can result in differing computing resource demands and thus different weights 310A and 310B.

As shown, the primary role 304A of the first software service 302A is tagged with a weight 310A of "5" while the primary role 304B of the second software service 302B is tagged with a weight 310B of "6.5" indicating that the primary role 304B imposes a greater computing resource demand in relation to the primary role 304A. Likewise, the secondary role 306A of the first software service 302A is tagged with a weight 312A of "3" while the secondary role 306B of the second software service 302B is tagged with a weight 312B of "4". In this way, the software orchestration system 102 can differentiate between the unique computing resource demands of different roles 304A-308A within a software service 302A as well as the same roles 304A and 304B across different software services 302A and 302B. Moreover, while the examples discussed herein include three roles 304-308, it should be understood that a software service 302A can define any suitable number of roles and corresponding weights.

Accordingly, the software orchestration system 102 can receive instances 316A and 316B from the first software service 302A and the second software service 302B respectively. In response, the software orchestration system 102 assigns the instances 316A and 316B to the computing environment 318. As described above, the computing environment 318 can be a cluster of one or several nodes 320. In the present example, the computing environment 318 contains three nodes 320A-320C. In addition, each individual node 320A-320C includes a constituent set of computing resources 322A-322C (e.g., CPUs, GPUs, memory, storage). As such, each node 320A-320C further includes a resource constraint respectively representing the capacity of the computing resources 322A-322C to execute the instances 316A and 316B.

In various examples, the software orchestration system 102 can be configured to avoid assigning instances 316A and 316B of different software services 302A to the same node 320A. Conversely, the software orchestration system 102 can be configured to freely assign the instances 316A and 316B of different software services 302A and 302B. Nonetheless, the software orchestration system 102 will assign the instances 316A and 316B to the computing environment 318 such that the sum of weights 310-314 of instances 316 within a given node 320A is less than or equal to the resource constraint 324A.

Figure 4:
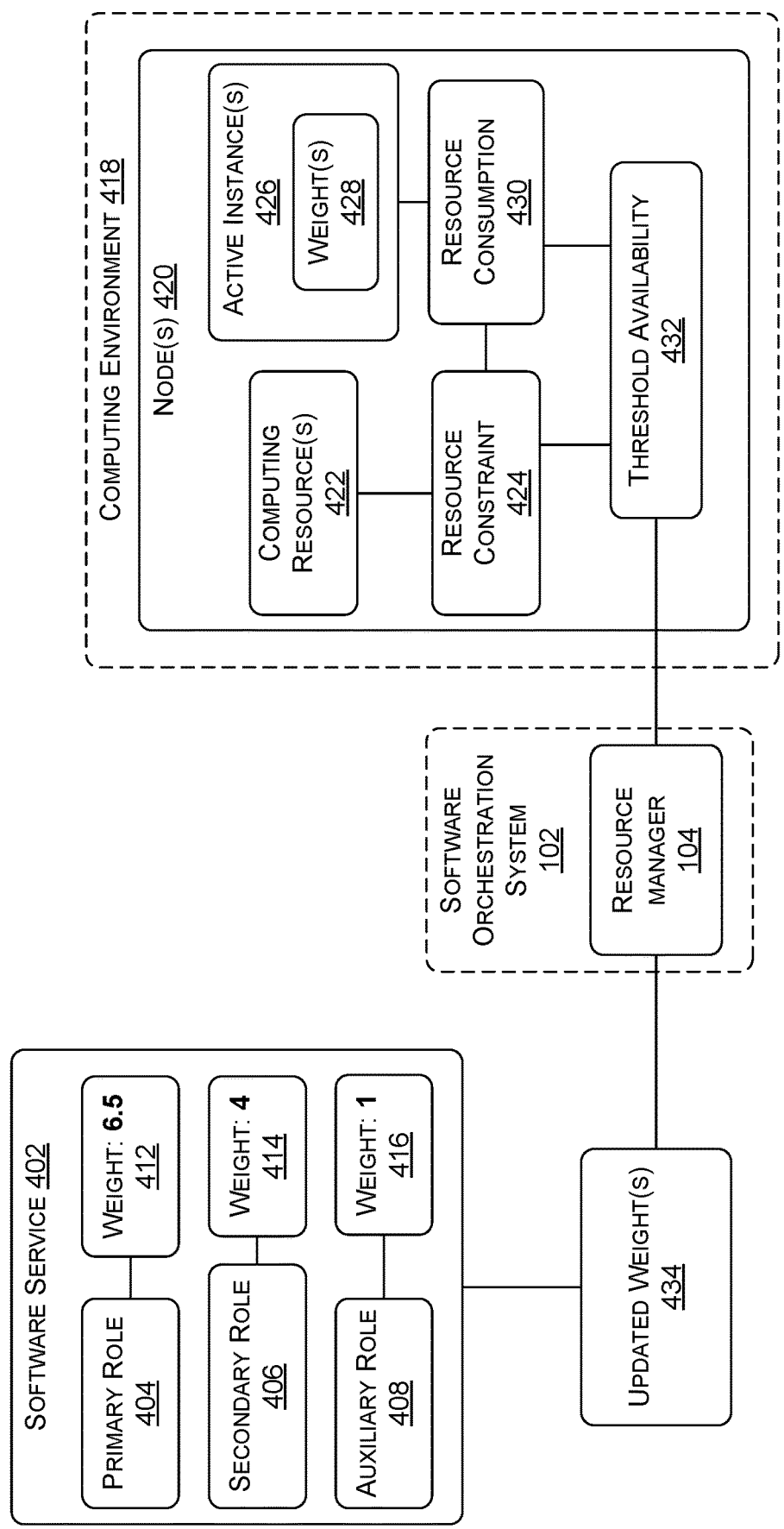
FIG. 4 illustrates a resource manager dynamically adjusted weights for a software service in response to changing conditions at a computing environment.

Proceeding to FIG. 4, aspects of dynamic weight adjustment are shown and described. Like in the examples described above, a software service 402 can define various roles such as a primary role 404, a secondary role 406, and an auxiliary role 408. Accordingly, each role 404-408 is tagged with a weight 412-416 respectively representing the computing resource demand of the associated role. Likewise, the computing environment 418 includes a node 420 containing a set of computing resources 422 that defines a resource constraint 424 representing the capacity of the node 420 to execute instances of the software service 402. As mentioned above, weights can be dynamically adjusted to suit changing conditions within the computing environment to provide flexibility and adaptability.

In the present example, there is an active instance 426 that is currently executing at the node 420. In a specific example, the active instance 426 is "in build" wherein the state of the active instance 426 is in the process of being defined. This can be achieved by retrieving data from an external store, constructing the state using another active instance 426, or any other means. Accordingly, the active instance 426 can include a weight 428 representing the computing resource demand of the active instance 426 like the weights 412-416. Consequently, the active instance 426 represents a certain amount of resource consumption 430 defined by the weight 428. For multiple active instances 426, the resource consumption 430 can be the sum of the respective weights 428 of the active instances 426. State another way, the current availability of the computing resources 422 can be defined as the difference between the resource constraint 424 and the resource consumption 430.

In some examples, the active instances 426 that are assigned to the node 420 can represent a resource consumption 430 that reaches the limit established by the resource constraint 424. That is, the current availability of the computing resources 422 is diminished by the resource consumption 430 such that the availability is less than or equal to a threshold availability 432. In various examples, the threshold availability 432 can be defined as a proportion of the resource constraint 424 (e.g., ten percent). Accordingly, the resource manager 104 of the software orchestration system 102 can detect the threshold availability 432 by monitoring the resource consumption 430 of the active instances 426. In response, the resource manager 104 can generate a set of updated weights 434 to disallow the placement of additional instances of the software service 402. This can be accomplished by increasing the weights 412-416.

For example, consider scenario in which the resource constraint 424 is defined as "40" and the threshold availability 432 is defined as ten percent of the resource constraint 424 (i.e., "4"). As such, when the difference between the resource constraint 424 and the resource consumption 430 (the sum of the weights 428) is less than or equal to four, the resource manager 104 generates a set of updated weights 434 to disallow placement of additional instances of the software service 402 at the node 420. In the present example, the updated weights 434 increase the weights 412-416 to a value that is greater than or equal to the threshold availability 432.

In an alternative example, the resource manager 104 can be configured to generate updated weights 434 to encourage placement of additional instances of the software service 402 at the node 420 to increase resource utilization. That is, during times when the resource consumption 430 is particularly low, the resource manager 104 can reduce the weights 412-416 to increase the number of active instances 426. In a specific example, the updated weights 434 set a weight 416 to "0" thereby enabling unlimited builds of the associated auxiliar role 408. This operation can be performed in response to determine that the auxiliar role 408 imposes a relatively miniscule computing resource demand.

Figure 5:
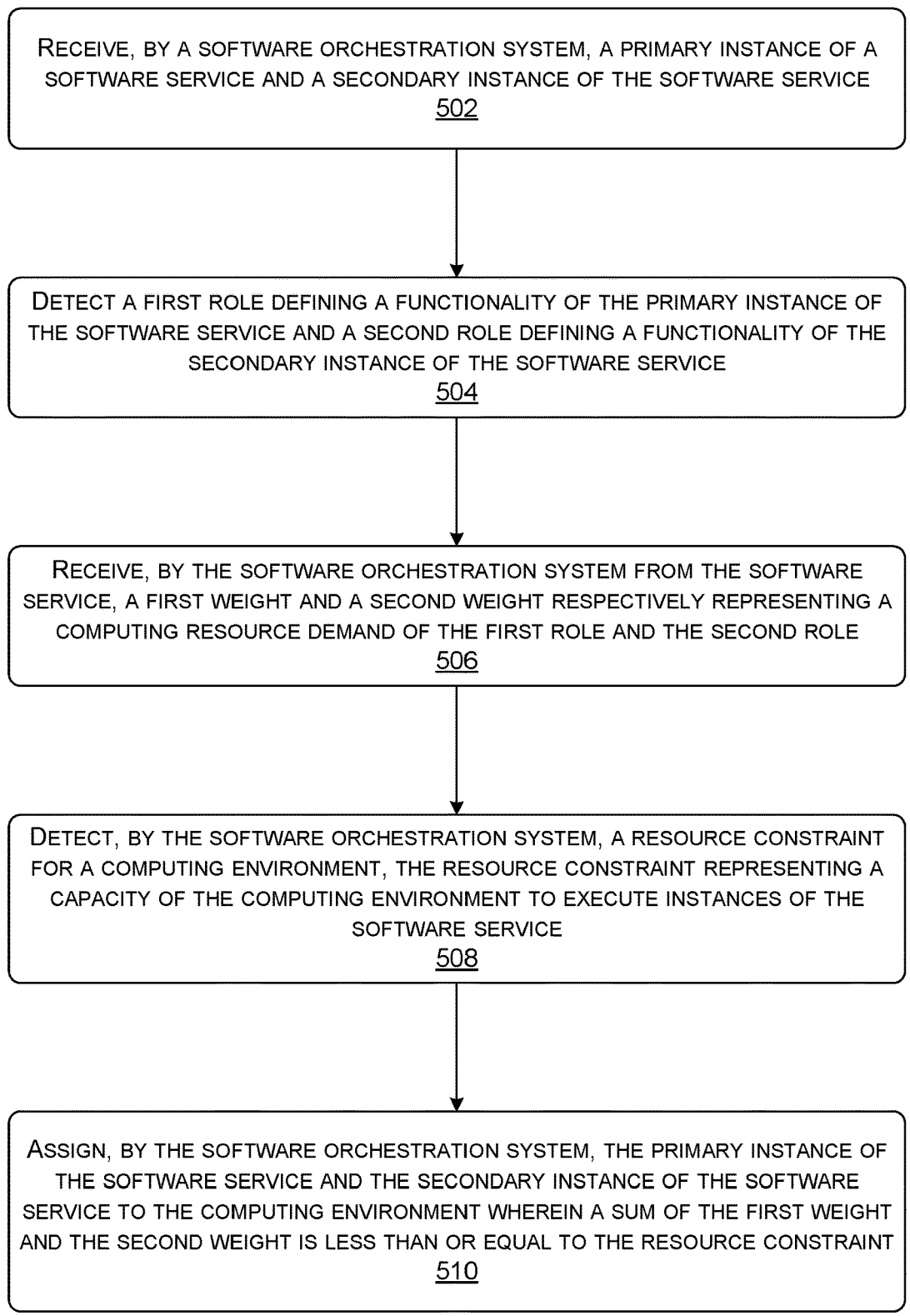
FIG. 5 is a flow diagram showing aspects of a process for utilizing differentiated weights and resource constraints to assign instances of a software service to a computing environment.

Turning now to FIG. 5, aspects of a process 500 for utilizing differentiated weights and resource constraints to assign instances of a software service to a computing environment are shown and described. With respect to FIG. 5, the process 500 begins at operation 502 where a software orchestration system receives a primary instance and a secondary instance of a software service. In various examples, the primary instance and the secondary instance can be received as part of a periodic refresh cycle of the software orchestration system, namely a resource manager. The receiving of the instances can accordingly be part of a build process in which the state of each instance is currently in the process of being defined. This can be achieved by retrieving data from an external store, constructing the state using another instance, or any other means.

Next, at operation 504, the software orchestration system detects a first role defining a functionality of the primary instance of the software service and a second role defining a functionality of the secondary instance of the software service. As mentioned above, the first role and the second role can be globally defined by the software service for the particular needs and functionalities of the software service.

Then, at operation 506, the software orchestration system receives a first weight and a second weight respectively representing a computing resource demand of the first role and the second role. As with the first role and the second role, the first weight and the second weight can be globally defined by the software service. In various examples, the weights can be calculated based on a stress test of each role. Alternatively, the weights can be calculated based on a theoretical computing resource demand of the role.

Subsequently, at operation 508, the software orchestration system detects a resource constraint for a computing environment, the resource constraint representing a capacity of the computing environment to execute instances of the software service. As described, a computing environment can comprise one or more individual computers (i.e., nodes) which can be virtual machines and/or physical machines. Accordingly, each computer includes its own set of computing resources (e.g., CPUs, GPUs, memory, storage), the aggregate computing capacity of which is quantitatively represented by the resource constraint.

Finally, at operation 510, the software orchestration system assigns the primary instance of the software service and the secondary instance of the software service to the computing environment wherein a sum of the first weight and the second weight is less than or equal to the resource constraint. As mentioned, the resource constraint can be defined on a per computer basis derived from the specific hardware and/or software configuration of the constituent set of computing resources.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
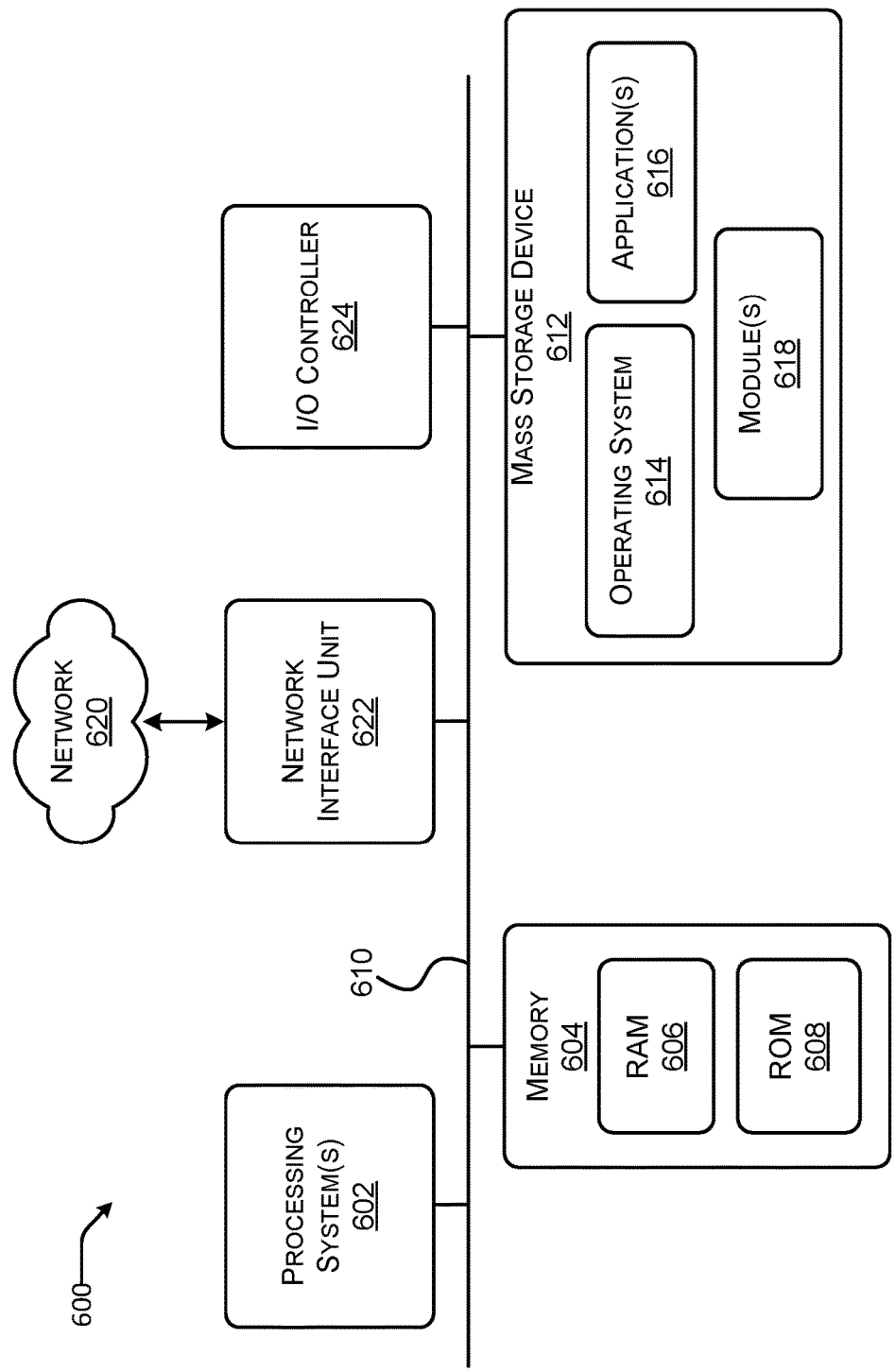
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
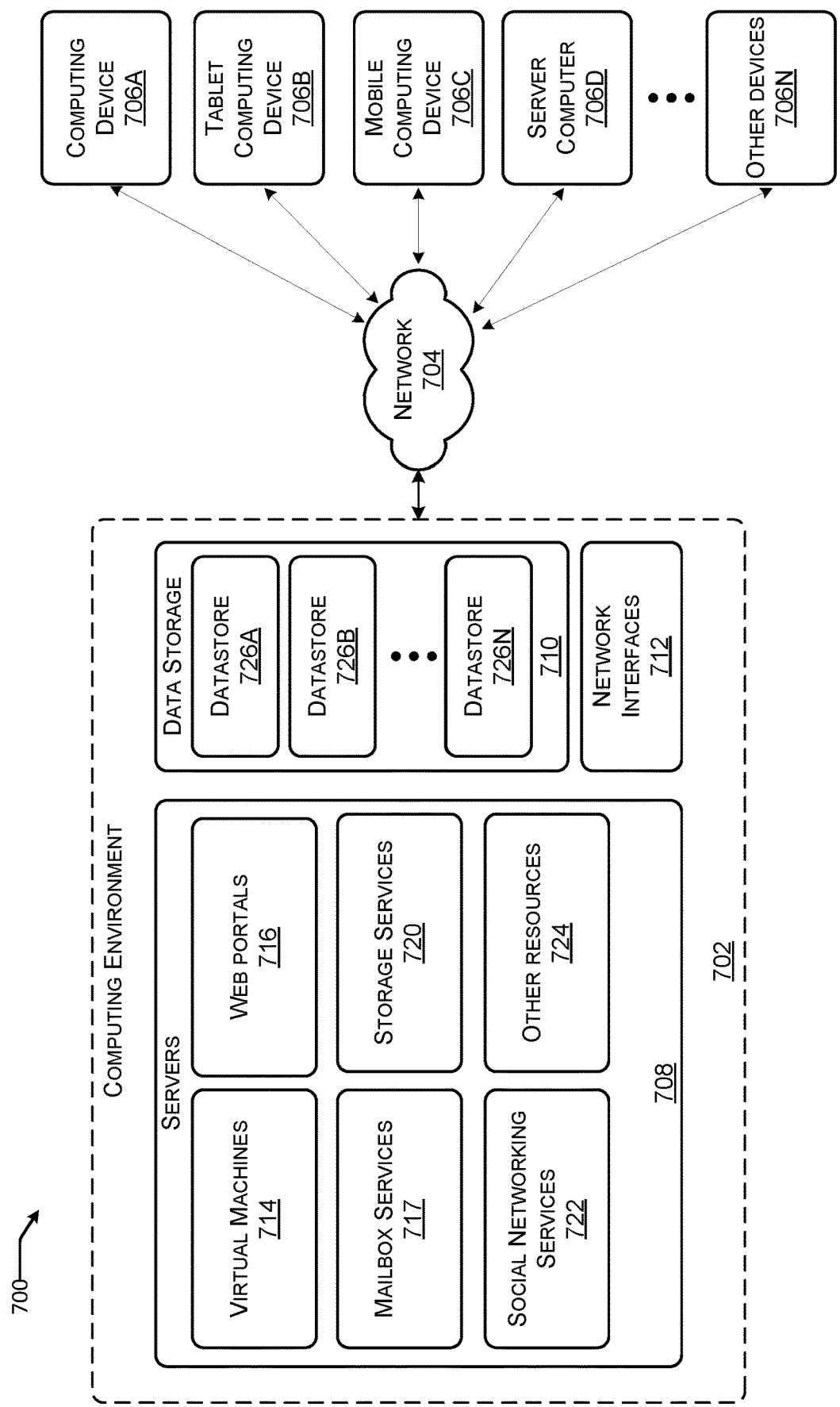
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: receiving, by a software orchestration system, a primary instance of a software service and a secondary instance of the software service; detecting a first role defining a functionality of the primary instance of the software service and a second role defining a functionality of the secondary instance of the software service; receiving, by the software orchestration system from the software service, a first weight and a second weight respectively representing a computing resource demand of the first role and the second role; detecting, by the software orchestration system, a resource constraint for a computing environment, the resource constraint representing a capacity of the computing environment to execute instances of the software service; and assigning, by the software orchestration system, the primary instance of the software service and the secondary instance of the software service to the computing environment wherein a sum of the first weight and the second weight is less than or equal to the resource constraint Example Clause B, the method of Example Clause A, further comprising: receiving an auxiliary instance of the software service; detecting a third role defining the functionality of the auxiliary role; receiving, by the software orchestration system from the software service, a third weight representing a computing resource demand of the third role; and assigning, by the software orchestration system, the auxiliary instance to the computing environment wherein the sum of the first weight, the second weight, and the third weight is less than or equal to the resource constraint.

Example Clause C, the method of Example Clause A or Example Clause B, wherein the first weight and the second weight are calculated based on a first stress test of the first role and a second stress test of the second role respectively.

Example Clause D, the method of Example Clause A or Example Clause B, wherein the first weight and the second weight are calculated based on a theoretical resource demand of the first role and second role respectively.

Example Clause E, the method of any one of Example Clause A through D, wherein the software service is a first software service, the method further comprising: receiving, by the software orchestration system, a primary instance of a second software service and a secondary instance of the second software service; detecting a third role defining a functionality of the primary instance of the second software service and a fourth role defining a functionality of the secondary instance of the second software service; receiving, by the software orchestration system from the second software service, a third weight and a fourth weight respectively representing a computing resource demand of the third role and the fourth role; and assigning the primary instance of the second software service and the secondary instance of the second software service to the computing environment wherein a sum of the first weight, the second weight, the third weight, and the fourth weight is less than or equal to the resource constraint.

Example Clause F, the method of any one of Example Clause A through E, wherein: the computing environment comprises a plurality of individual computers; and each of the individual computers includes an individual resource constraint.

Example Clause G, the method of Example Clause F, wherein: the primary instance of the software service is assigned to a first individual computer of the plurality of individual computers; and the secondary instance of the software service is assigned to a second individual computer of the plurality of individual computers.

Example Clause H, the method of any one of Example Clause A through G, further comprising: detecting a decreased computing resource availability at the computing environment; in response to detecting the decreased computing resource availability at the computing environment, increasing at least one of the first weight and the second weight to reduce a resource consumption of the software service.

Example Clause I, a system comprising: a processing system; and a computer-readable medium having encoded thereon instructions that when executed by the processing system, cause the system to perform operations comprising: receiving, by a software orchestration system, a primary instance of a software service and a secondary instance of the software service; detecting a first role defining a functionality of the primary instance of the software service and a second role defining a functionality of the secondary instance of the software service; receiving, by the software orchestration system from the software service, a first weight and a second weight respectively representing a computing resource demand of the first role and the second role; detecting, by the software orchestration system, a resource constraint for a computing environment, the resource constraint representing a capacity of the computing environment to execute instances of the software service; and assigning, by the software orchestration system, the primary instance of the software service and the secondary instance of the software service to the computing environment wherein a sum of the first weight and the second weight is less than or equal to the resource constraint.

Example Clause J, the system of Example Clause I, wherein the first weight and the second weight are calculated based on a first stress test of the first role and a second stress test of the second role respectively.

Example Clause K, the system of Example Clause I, wherein the first weight and the second weight are calculated based on a theoretical resource demand of the first role and second role respectively.

Example Clause L, the system of any one of Example Clause I through K, wherein: the software service is a first software service; and the operations further comprise: receiving, by the software orchestration system, a primary instance of a second software service and a secondary instance of the second software service; detecting a third role defining a functionality of the primary instance of the second software service and a fourth role defining a functionality of the secondary instance of the second software service; receiving, by the software orchestration system from the second software service, a third weight and a fourth weight respectively representing a computing resource demand of the third role and the fourth role; and assigning the primary instance of the second software service and the secondary instance of the second software service to the computing environment wherein a sum of the first weight, the second weight, the third weight, and the fourth weight is less than or equal to the resource constraint.

Example Clause M, the system of any one of Example Clause I through L, wherein: the computing environment comprises a plurality of individual computers; and each of the individual computers includes an individual resource constraint.

Example Clause N, the system of Example Clause M, wherein: the primary instance of the software service is assigned to a first individual computer of the plurality of individual computers; and the secondary instance of the software service is assigned to a second individual computer of the plurality of individual computers.

Example Clause O, the system of any one of Example Clause I through N, wherein the operations further comprise: detecting a decreased computing resource availability at the computing environment; in response to detecting the decreased computing resource availability at the computing environment, increasing at least one of the first weight and the second weight to reduce a resource consumption of the software service.

Example Clause P, a computer-readable storage medium having encoded thereon computer-readable instructions that when executed by a system cause the system to perform operations comprising: receiving, by a software orchestration system, a primary instance of a software service and a secondary instance of the software service; detecting a first role defining a functionality of the primary instance of the software service and a second role defining a functionality of the secondary instance of the software service; receiving, by the software orchestration system from the software service, a first weight and a second weight respectively representing a computing resource demand of the first role and the second role; detecting, by the software orchestration system, a resource constraint for a computing environment, the resource constraint representing a capacity of the computing environment to execute instances of the software service; and assigning, by the software orchestration system, the primary instance of the software service and the secondary instance of the software service to the computing environment wherein a sum of the first weight and the second weight is less than or equal to the resource constraint.

Example Clause Q, The computer-readable storage medium of Example Clause P, wherein the first weight and the second weight are calculated based on a theoretical resource demand of the first role and second role respectively.

Example Clause R, the computer-readable storage medium of Example Clause P or Example Clause Q, wherein: the software service is a first software service; and the operations further comprise: receiving, by the software orchestration system, a primary instance of a second software service and a secondary instance of the second software service; detecting a third role defining a functionality of the primary instance of the second software service and a fourth role defining a functionality of the secondary instance of the second software service; receiving, by the software orchestration system from the second software service, a third weight and a fourth weight respectively representing a computing resource demand of the third role and the fourth role; and assigning the primary instance of the second software service and the secondary instance of the second software service to the computing environment wherein a sum of the first weight, the second weight, the third weight, and the fourth weight is less than or equal to the resource constraint.

Example Clause S, the computer-readable storage medium of any one of Example Clause P through R, wherein: the computing environment comprises a plurality of individual computers; and each of the individual computers includes an individual resource constraint.

Example Clause T, the computer-readable storage medium of Example Clause S, wherein: the primary instance of the software service is assigned to a first individual computer of the plurality of individual computers; and the secondary instance of the software service is assigned to a second individual computer of the plurality of individual computers.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resource constraints).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:
1. A method comprising:
receiving, by a software orchestration system, a primary instance of a software service and a secondary instance of the software service to be assigned to a computing environment to prepare the software service for use;
detecting a first role defining a functionality of the primary instance of the software service and a second role defining a functionality of the secondary instance of the software service;

receiving, by the software orchestration system from the software service, a first weight and a second weight respectively representing a computing resource demand of the first role and the second role, wherein the first weight and the second weight are defined by the software service;

detecting, by the software orchestration system, a resource constraint for the computing environment, the resource constraint representing a capacity of the computing environment to execute instances of the software service; and assigning, by the software orchestration system, the primary instance of the software service and the secondary instance of the software service to the computing environment, wherein a sum of the first weight and the second weight is less than or equal to the resource constraint.

2. The method of claim 1, further comprising:
receiving an auxiliary instance of the software service;
detecting a third role defining a functionality of the auxiliary role;
receiving, by the software orchestration system from the software service, a third weight representing a computing resource demand of the third role; and
assigning, by the software orchestration system, the auxiliary instance to the computing environment, wherein a sum of the first weight, the second weight, and the third weight is less than or equal to the resource constraint.

3. The method of claim 1, wherein the first weight and the second weight are calculated based on a first stress test of the first role and a second stress test of the second role respectively.

4. The method of claim 1, wherein the first weight and the second weight are calculated based on a theoretical resource demand of the first role and second role respectively.

5. The method of claim 1, wherein the software service is a first software service, the method further comprising:
receiving, by the software orchestration system, a primary instance of a second software service and a secondary instance of the second software service;
detecting a third role defining a functionality of the primary instance of the second software service and a fourth role defining a functionality of the secondary instance of the second software service;
receiving, by the software orchestration system from the second software service, a third weight and a fourth weight respectively representing a computing resource demand of the third role and the fourth role, wherein the third weight and the fourth weight are defined by the second software service; and
assigning the primary instance of the second software service and the secondary instance of the second software service to the computing environment, wherein a sum of the first weight, the second weight, the third weight, and the fourth weight is less than or equal to the resource constraint.

6. The method of claim 1, wherein:
the computing environment comprises a plurality of individual computers; and
each of the individual computers includes an individual resource constraint.

7. The method of claim 6, wherein:
the primary instance of the software service is assigned to a first individual computer of the plurality of individual computers; and the secondary instance of the software service is assigned to a second individual computer of the plurality of individual computers.

8. The method of claim 1, further comprising:
detecting a decreased computing resource availability at the computing environment;
in response to detecting the decreased computing resource availability at the computing environment, increasing at least one of the first weight or the second weight defined by the software service to reduce a resource consumption of the software service.

9. A system comprising:
a processing system; and
a computer-readable medium having encoded thereon instructions that when executed by the processing system, cause the system to perform operations comprising:
receiving, by a software orchestration system, a primary instance of a software service and a secondary instance of the software service to be assigned to a computing environment to prepare the software service for use;
detecting a first role defining a functionality of the primary instance of the software service and a second role defining a functionality of the secondary instance of the software service;
receiving, by the software orchestration system from the software service, a first weight and a second weight respectively representing a computing resource demand of the first role and the second role, wherein the first weight and the second weight are defined by the software service;
detecting, by the software orchestration system, a resource constraint for the computing environment, the resource constraint representing a capacity of the computing environment to execute instances of the software service; and
assigning, by the software orchestration system, the primary instance of the software service and the secondary instance of the software service to the computing environment, wherein a sum of the first weight and the second weight is less than or equal to the resource constraint.

10. The system of claim 9, wherein the first weight and the second weight are calculated based on a first stress test of the first role and a second stress test of the second role respectively.

11. The system of claim 9, wherein the first weight and the second weight are calculated based on a theoretical resource demand of the first role and second role respectively.

12. The system of claim 9, wherein:
the software service is a first software service; and
the operations further comprise:
receiving, by the software orchestration system, a primary instance of a second software service and a secondary instance of the second software service;
detecting a third role defining a functionality of the primary instance of the second software service and a fourth role defining a functionality of the secondary instance of the second software service;
receiving, by the software orchestration system from the second software service, a third weight and a fourth weight respectively representing a computing resource demand of the third role and the fourth role, wherein the third weight and the fourth weight are defined by the second software service; and assigning the primary instance of the second software service and the secondary instance of the second software service to the computing environment wherein, a sum of the first weight, the second weight, the third weight, and the fourth weight is less than or equal to the resource constraint.

13. The system of claim 9, wherein:
the computing environment comprises a plurality of individual computers; and
each of the individual computers includes an individual resource constraint.

14. The system of claim 13, wherein:
the primary instance of the software service is assigned to a first individual computer of the plurality of individual computers; and
the secondary instance of the software service is assigned to a second individual computer of the plurality of individual computers.

15. The system of claim 9, wherein the operations further comprise:
detecting a decreased computing resource availability at the computing environment;
in response to detecting the decreased computing resource availability at the computing environment, increasing at least one of the first weight or the second weight defined by the software service to reduce a resource consumption of the software service.

16. A computer-readable storage medium having encoded thereon computer-readable instructions that, when executed by a system, cause the system to perform operations comprising:
receiving, by a software orchestration system, a primary instance of a software service and a secondary instance of the software service to be assigned to a computing environment to prepare the software service for use;
detecting a first role defining a functionality of the primary instance of the software service and a second role defining a functionality of the secondary instance of the software service;
receiving, by the software orchestration system from the software service, a first weight and a second weight respectively representing a computing resource demand of the first role and the second role, wherein the first weight and the second weight are defined by the software service;
detecting, by the software orchestration system, a resource constraint for the computing environment, the resource constraint representing a capacity of the computing environment to execute instances of the software service; and
assigning, by the software orchestration system, the primary instance of the software service and the secondary instance of the software service to the computing environment, wherein a sum of the first weight and the second weight is less than or equal to the resource constraint.

17. The computer-readable storage medium of claim 16, wherein the first weight and the second weight are calculated based on a theoretical resource demand of the first role and second role respectively.

18. The computer-readable storage medium of claim 16, wherein:
the software service is a first software service; and
the operations further comprise:
receiving, by the software orchestration system, a primary instance of a second software service and a secondary instance of the second software service;
detecting a third role defining a functionality of the primary instance of the second software service and a fourth role defining a functionality of the secondary instance of the second software service;
receiving, by the software orchestration system from the second software service, a third weight and a fourth weight respectively representing a computing resource demand of the third role and the fourth role, wherein the third weight and the fourth weight are defined by the second software service; and
assigning the primary instance of the second software service and the secondary instance of the second software service to the computing environment, wherein a sum of the first weight, the second weight, the third weight, and the fourth weight is less than or equal to the resource constraint.

19. The computer-readable storage medium of claim 16, wherein:
the computing environment comprises a plurality of individual computers; and
each of the individual computers includes an individual resource constraint.

20. The computer-readable storage medium of claim 19, wherein:
the primary instance of the software service is assigned to a first individual computer of the plurality of individual computers; and
the secondary instance of the software service is assigned to a second individual computer of the plurality of individual computers.

* * * * *